United States Patent Office 3,621,576
Patented Nov. 23, 1971

3,621,576
SEMIBAKED PORCELAIN TEETH
Rafael Gnecco, 3820 Waldo Ave.,
Riverdale, Bronx, N.Y. 10463
No Drawing. Continuation of application Ser. No. 674,027, Aug. 10, 1967. This application Mar. 17, 1970, Ser. No. 19,522
Int. Cl. A61c 13/00
U.S. Cl. 32—8
10 Claims

ABSTRACT OF THE DISCLOSURE

A process for fabricating a dental appliance or tooth structure in which a porcelain mixture is initially shaped and fired to a temperature below the vitrification point. Those surfaces which are to be worked and modified subsequently to fit the appliance to a particular case, are then coated with refractory material. After heating the structure to the vitrification point, the covered surfaces are worked and shaped to particular requirements, and the resulting mass is reheated to the vitrification point to render a homogeneously fused structure with finished surfaces.

This application is a continuation of the copending application Ser. No. 674,027, filed on Aug. 10, 1967, and now abandoned.

The present invention relates to a new type of porcelain teeth that are easier to use and result in a finished product superior to any porcelain teeth known in the art. My invention consists of porcelain teeth prepared in such a manner that one or more faces of the tooth are finished (fused to the vitrification point) and other faces are semibaked (heated to the point of concretion but not to the vitrification point). As will be described below, semibaked porcelain teeth will offer the user many advantages over the fully vitrified teeth now available commercially for making prosthetic dental appliances. Semibaked teeth are not only easier and quicker to use, but will also result in a better finished product.

In order to establish the significant advantages that accrue from using my semibaked porcelain teeth, both present practice using fully vitrified commercial teeth and the method of applying my semibaked porcelain teeth will be described and compared.

The standard procedure for adapting fully vitrified commercial porcelain teeth for prosthetic dental appliances is to select a tooth that approximately meets the requirements of the case and fit it exactly to the appliance by grinding and/or by adding porcelain of lower fusion point. The modified tooth is then fired to make it a somewhat integral structure. In working with present commercial porcelain teeth, the operator is dealing with a completely vitrified tooth which is hard and brittle and therefore difficult to recontour, whose surface integrity is violated by grinding and to which only porcelain of a lower fusion point can be adhered. Because the vitrified tooth is nonporous, added porcelain cannot diffuse into it and the entire structure cannot be considered a monolithic entity, even after firing to full vitrification.

To adapt one of my semibaked porcelain teeth to a particular application, in accordance with the present invention, the technician or dentist selects a semibaked tooth suitable to the case, that is, one where all surfaces that do not require work are completely finished (vitrified) enabling him to match color, gloss and transparency exactly, but where all the tooth surfaces that require work are semibaked (fired to concretion but not to vitrification). All necessary grinding is done easily and quickly on the soft, non-vitrified, porcelain rather than on the hard, brittle, vitrified porcelain. To build up the tooth, porcelain with the same fusion point as the semibaked tooth is applied to the porous semibaked surfaces where it is absorbed for maximum adhesion after firing. The finished tooth is then fired to vitrification forming a strong monolithic structure with a uniform glossy surface which is impervious, smooth and sanitary. Semibaked teeth are less susceptible to cracks, chipping or spoiling during the handling or the extreme pressure of mastication.

Semibaked porcelain teeth in accordance with the present invention are manufactured by molding or carving raw porcelain to the desired shape, color, and size and then firing the raw porcelain tooth to a temperature approximately fifty degrees Fahrenheit or more below the vitrification point of the porcelain used. This firing will bring the tooth to concretion, a state in which the porcelain is mechanically strong but is still porous and is not brittle. Those surfaces that are to remain in the porous condition are then covered with a refractory insulating material such as platinum or palladium foil and coated with refractory cement. The insulated tooth is then heated quickly to vitrify the exposed surfaces without affecting the insulated surfaces. The semibaked tooth is now complete and ready to use as I have described.

Semibaked teeth can be manufactured in several different forms such as complete teeth, hollow shells or thimbles, porcelain jackets, partial teeth either solid or hollow, or in any form necessary for the manufacture of prosthetic dental appliances or as required by the dental profession. Semibaked teeth can also be manufactured with any of their surfaces vitrified or in any combination of vitrified and unvitrified (semibaked) surfaces, including semibaked teeth without any vitrified surfaces.

The method of manufacture of semibaked porcelain teeth is not critical and my invention includes any variation or method of achieving the same result.

What is claimed is:

1. A semifinished artificial tooth adapted for shaping and mounting in a dental appliance for a dental patient comprising a body of porcelain, said body including a finished surface area having the predetermined size, shape and color of the tooth and an unfinished area, said porcelain in said finished surface area being fully-baked to a vitrified state, said unfinished area of said porcelain in said body being semi-baked to a concretionary, unvitrified state for ease in modifying and trimming to conform to the dental appliance requirements of the patient, the interface between said vitrified and unvitrified areas of said body being such that, when said body is heated to the vitrification temperature after modifying and trimming, said body is fused into a monolithic structure.

2. A semifinished artificial tooth, as defined in claim 1, wherein said semi-baked unfinished area of said body has not been heated during baking to above 50° F. below the vitrification temperature of said porcelain.

3. A process for fabricating a dental structure for a dental patient comprising, in sequence, the steps of forming porcelain into an initial shape; firing said formed porcelain to a temperature below the vitrification point of said porcelain; covering at least a portion of said porcelain with refractory material; heating said porcelain with refractory material to the vitrification point of said porcelain so that the portion of said porcelain free of refractory material is vitrified, the portion of said porcelain covered with refractory material remaining in unvitrified semibaked state; modifying and trimming afterward the shape of said semibaked portion to conform to a predetermined contour as required by said patient; and heating said structure to the vitrification temperature of said porcelain after said modifying and trimming step so that said semibaked portion becomes vitrified, whereby said dental structure is a homogeneously fused structure of predetermined shape.

4. The process as defined in claim 3 wherein said temperature in said step of firing said formed porcelain is 50° F. below the vitrification point of said porcelain.

5. The process as defined in claim 3 wherein said refractory material is platinum.

6. The process as defined in claim 3 wherein said refractory material is palladium.

7. The process as defined in claim 3 including the step of coating said refractory material with refractory cement.

8. A process for fabricating a semifinished artificial tooth adapted to be easily modified and trimmed to a finished shape for use in a dental appliance meeting the specific requirements of a dental patient comprising the steps of: forming a body of porcelain into an initial shape, predetermined surface areas of said shaped body being the same as corresponding surface areas of the finished shape of the tooth; and baking said porcelain body to selectively vitrify the porcelain in said predetermined surface areas, the remainder of the porcelain in said body being semibaked to a concretionary, unvitrified state whereby said remainder is easily modified and trimmed and, when said body is reheated to the vitrification temperature of said porcelain, said body is fused into a monolithic structure.

9. A process for fabricating a semifinished artificial tooth, as set forth in claim 8, and including the step of insulating with a refractory material all surfaces of said body other than said predetermined surface areas prior to baking such that said remainder of said porcelain is not heated above 50° F. below the vitrification temperature of said porcelain during baking.

10. A process for fabricating a semifinished artificial tooth, as set forth in claim 9, and including the step of baking said body to a concretionary state at a temperature below the vitrification temperature of said porcelain prior to insulating surfaces of said body other than said predetermined surface areas.

References Cited

UNITED STATES PATENTS

| 866,305 | 9/1907 | Roach | 106—35 |
| 2,334,319 | 11/1943 | Erdle | 106—35 |

OTHER REFERENCES

The Dentists Supply Company of New York, York, Pa., 1966, p. 5, "Behind the Smile."

ROBERT PESHOCK, Primary Examiner